United States Patent
Tkach et al.

(10) Patent No.: US 11,283,859 B1
(45) Date of Patent: *Mar. 22, 2022

(54) SYSTEM, METHOD, AND COMPUTER PROGRAM FOR PERFORMING DISTRIBUTED OUTSOURCED COMPUTING

(71) Applicant: Amdocs Development Limited, Limassol (CY)

(72) Inventors: Vladimir Tkach, Kefar Yona (IL); Yuri Kroz, Vancouver (CA)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,808

(22) Filed: Apr. 20, 2021

Related U.S. Application Data (63) Continuation of application No. 16/374,523, filed on Apr. 3, 2019, now Pat. No. 11,012,501.

(60) Provisional application No. 62/652,207, filed on Apr. 3, 2018.

(51) Int. Cl.
*H04L 67/10* (2022.01)
*G06F 16/23* (2019.01)

(52) U.S. Cl.
CPC .......... *H04L 67/10* (2013.01); *G06F 16/2379* (2019.01)

(58) Field of Classification Search
CPC ............................. H04L 67/10; G06F 16/2379
USPC ......................................................... 709/201
See application file for complete search history.

(56) References Cited

U.S. PATENT DOCUMENTS 9,329,909 B1 * 5/2016 Khanna ................. G06F 9/5072
2016/0373370 A1 * 12/2016 Suchter ................... H04L 43/04

FOREIGN PATENT DOCUMENTS

WO WO-2005008492 A2 * 1/2005 ........... G06F 9/5072
WO WO-2017090041 A1 * 6/2017 ............. G06F 21/64

OTHER PUBLICATIONS

David Treat, Editing the uneditable why blockchain needs to adapt to an imperfect world, Feb. 5, 2017, accenture.com, https://web.archive.org/web/20170205050545/https://www.accenture.com/us-en/insight-editing-uneditable-blockchain (Year: 2017).*

* cited by examiner

*Primary Examiner* — Zi Ye
(74) *Attorney, Agent, or Firm* — Zilka-Kotab, P.C.

(57) ABSTRACT

A system, method, and computer program product are provided for performing distributed outsourced computing. In operation, a master node in a general distributed computing cluster monitors a network for computing resources. The general distributed computing cluster includes the master node and a plurality of slave nodes. The master node determines whether computing resources are available from one or more of the plurality of slave nodes. If it is determined that computing resources are available, the master node identifies the one or more of the plurality of slave nodes as an auxiliary master node. Further, the master node publishes information associated with one or more unfinished computing tasks dedicated to the master node to a blockchain for access by the one or more of the plurality of slave nodes for processing.

17 Claims, 6 Drawing Sheets

SYSTEM, METHOD, AND COMPUTER PROGRAM FOR PERFORMING DISTRIBUTED OUTSOURCED COMPUTING

RELATED APPLICATIONS

The present application is a continuation of U.S. application Ser. No. 16/374,523, filed Apr. 3, 2019 and entitled "SYSTEM, METHOD, AND COMPUTER PROGRAM FOR PERFORMING DISTRIBUTED OUTSOURCED COMPUTING," which in turn claims priority to U.S. Provisional Application No. 62/652,207, entitled "SYSTEM, METHOD, AND COMPUTER PROGRAM FOR PERFORMING DISTRIBUTED OUTSOURCED COMPUTING," filed on Apr. 3, 2018, the entire contents of which are incorporated herein by reference.

FIELD OF THE INVENTION

The present invention relates to distributed computing, and more particularly to performing distributed outsourced computing.

BACKGROUND

Computing resources allocated to solving a specific problem are limited and expensive to scale. On the other hand, the total amount of computing power (e.g. even in house, such as employees' work stations, mobile devices, etc.) is enormous.

Currently, distributed systems developed within enterprise companies execute a lot of in house computation processes on dedicated hardware resources. Hardware scaling makes this procedure too expensive for day to day maintenance regarding IT resources, electricity, power, additional hardware cost, and network usage, etc.

Once there is a need to scale out a computing cluster, a company pays for new hardware, configures it, and adds the computing resource to the existing cluster. However, many employees' workstations are underutilized as less than 60% of their computing power is being utilized.

There is thus a need for addressing these and/or other issues associated with the prior art.

SUMMARY

A system, method, and computer program product are provided for performing distributed outsourced computing. In operation, a master node in a general distributed computing cluster monitors a network for computing resources. The general distributed computing cluster includes the master node and a plurality of slave nodes. The master node determines whether computing resources are available from one or more of the plurality of slave nodes. If it is determined that computing resources are available, the master node identifies the one or more of the plurality of slave nodes as an auxiliary master node. Further, the master node publishes information associated with one or more unfinished computing tasks dedicated to the master node to a blockchain for access by the one or more of the plurality of slave nodes for processing.

DETAILED DESCRIPTION

Figure 1:
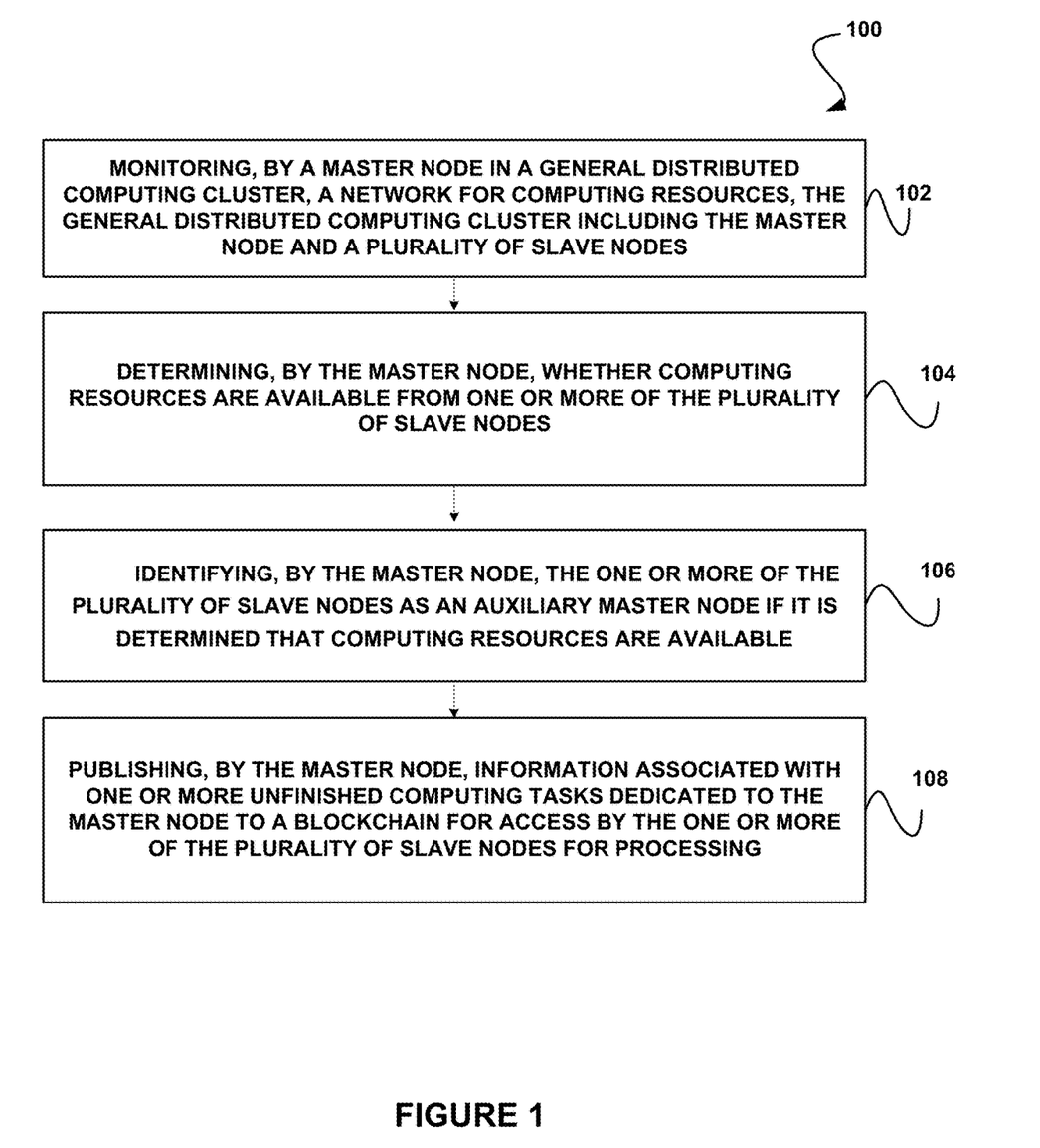
FIG. 1 illustrates a method for performing distributed outsourced computing, in accordance with one embodiment.

FIG. 1 illustrates a method 100 for performing distributed outsourced computing, in accordance with one embodiment.

In operation, a master node in a general distributed computing cluster monitors a network for computing resources. See operation 102. The general distributed computing cluster includes the master node and a plurality of slave nodes. The nodes may include any type of computing device, such as computers, mobile phones, tablets, televisions, and/or any other device capable of performing computations. Moreover, the nodes may be in the same geographical location (e.g. the same building, etc.) or a different geographical location (e.g. a different country, etc.).

The master node determines whether computing resources are available from one or more of the plurality of slave nodes. See operation 104.

If it is determined that computing resources are available, the master node identifies the one or more of the plurality of slave nodes as an auxiliary master node. See operation 106.

Further, the master node publishes information associated with one or more unfinished computing tasks dedicated to the master node to a blockchain for access by the one or more of the plurality of slave nodes for processing. See operation 108. In this way, the slave node may obtain state information from the blockchain and help the master node with the processing task. The slave node may then update the blockchain with state information when the task is complete.

In one embodiment, all nodes in the general distributed computing cluster may publish job information, including state information to the blockchain. In this way, any node in the cluster may receive unfinished job information from the blockchain and help with computing any job for any node in the cluster. For example, if a node in the cluster fails, another node in the cluster may pull unfinished job information from the blockchain and finish the processing. That node may then update the blockchain with finished job information (i.e. the state, etc.).

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
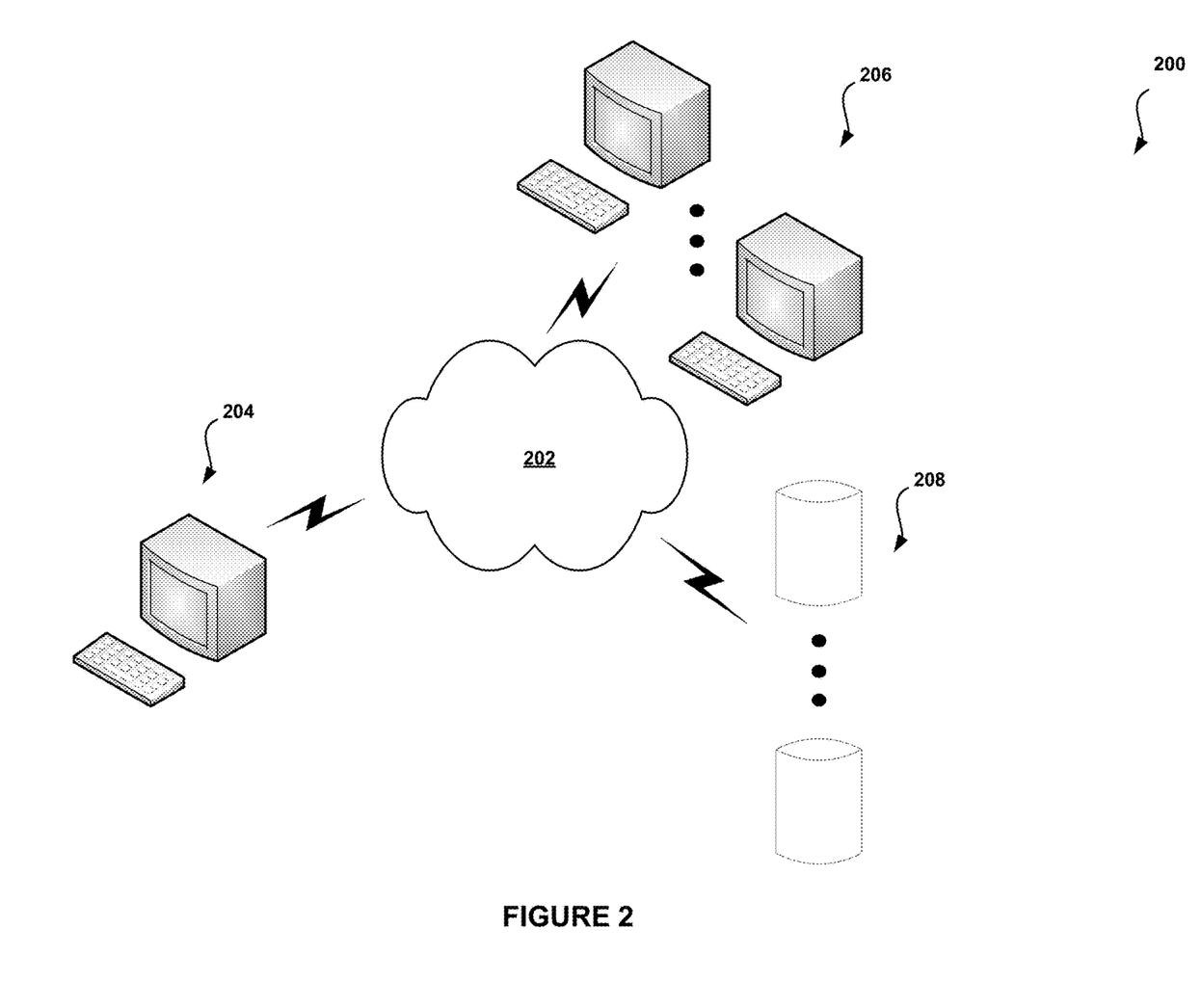
FIG. 2 shows a system for performing distributed outsourced computing, in accordance with one embodiment.

FIG. 2 shows a system 200 for performing distributed outsourced computing, in accordance with one embodiment.

As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206 (e.g. slave nodes, etc.), either directly or over one or more networks 202, for performing distributed outsourced computing. The system 204 may also be in communication with one or more repositories/databases 208. It should be noted that the system 204 and the systems 206 may represent any type of computing device, such as computers, mobile phones, tablets, televisions, and/ or any other device capable of performing computations. Moreover, the system 204 and the systems 206 may be in the same location or across various geographical locations (e.g. different countries, etc.).

Usually a distributed competition cluster comprises a master node managing a computation task parallelization by distributing parts of the task among "slave" nodes. In operation, the system 204 may turn one of the slave nodes (e.g. nodes 206, etc.) in a distributed computing cluster into a special kind of a node for "outsourcing" computation tasks. The node will be considered as another slave node by the current master node (in this example system 204), though the actual execution of the task will be run on an external remote resource, which can happen to be any employee's workstation, or corporate mobile device, etc. (even Android TV, coffee machines, etc.).

Computing resources allocated for solving a specific problem are limited and expensive to scale. On the other hand, the total amount of computing power (even in house, such as employees' work stations, mobile devices, etc.) is enormous comparatively.

Currently, distributed systems developed within enterprise companies execute a lot of in house computation processes on dedicated hardware resources. Hardware scaling makes this procedure too expensive for day to day maintenance regarding IT resources, electricity, power, additional hardware cost, and network usage, etc.

Once there is a need to scale out a computing cluster, a company pays for new hardware, configures it, and adds the computing resource to the existing cluster. However, many employees' workstations are underused, as less than 60% of their computing power is being utilized. Thus, the system 204 may use a part of the available unutilized computing power to boost distributed computation processes.

By implementing this architecture, an enterprise becomes "greener" as it utilizes more electricity more efficiently. The computation tasks continue to stay in house and not on an external cloud while being boosted by the existing resources. Furthermore, there is less waste of computing resources within an enterprise.

Furthermore, a corporation might take an advantage of outsourcing an in house computation grid to external stockholders and get paid in return.

Figure 3:
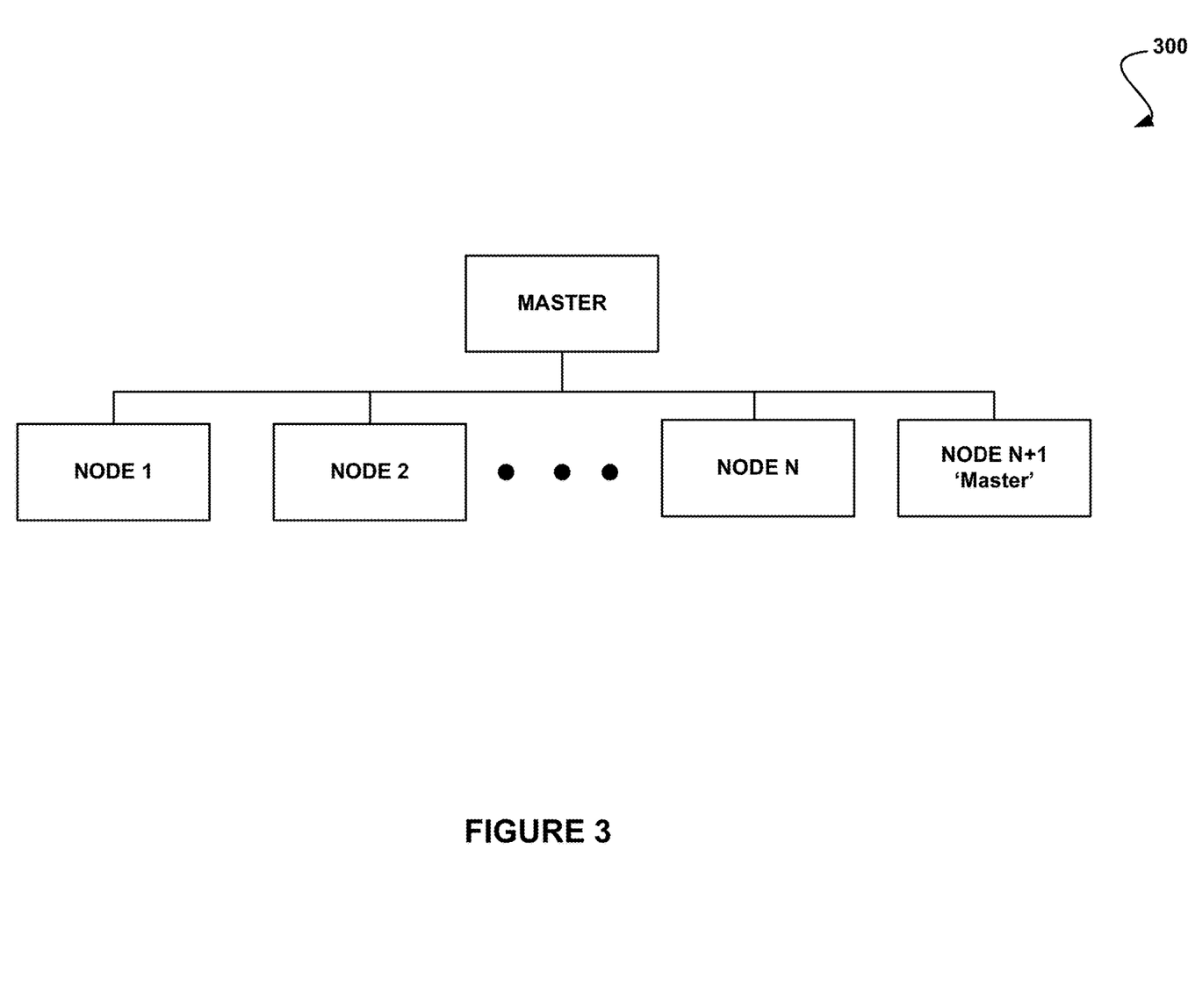
FIG. 3 shows a system diagram for performing distributed outsourced computing, in accordance with one embodiment.

FIG. 3 shows a system diagram 300 for performing distributed outsourced computing, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

The diagram 300 shows a general distributed computing cluster, consisting of a master node and N+1 slave nodes. In operation, slave nodes request computing jobs from the master. Utilizing the techniques described herein, the master node may select an additional "special" slave node, which on the one hand will behave and seen by the master as a usual "slave node" and on the other hand it will be used as "master node" of the corporate intranet computing cloud.

The master node of the system periodically monitors an intranet/network for available computing resources. For the vacant resources, the master node distributes computing jobs among the system. In the case that there are no available resources, the master node works as a usual node.

Regarding a collection of all unfinished computing jobs, the master node distributes them at last known state. When a client approved for a job execution receives a computing job, a smart contract will be submitted. On every calculation step, a client node informs the system (i.e. the master node and/or blockchain) about its current state. Hence, all other client nodes on the system know the state of the job.

When a client node fails to complete a job or is unresponsive for a long time, any other node on the system can continue the job from its last known state. In case of calculation success, other nodes that depend on the calculation can start/continue their jobs.

When a client node finishes a calculation, the slave dedicated as a master node provides the real master node with the calculation results. Since the system works based on smart contracts based on blockchain technology, for any computing resource that fails, any other vacant computing resource in the blockchain will continue the failed (unfinished) job from the last known state.

Blockchain refers to a digitized, decentralized, public ledger containing crypto transactions, constantly growing as "completed" blocks (representing transactions) are recorded and added to it in chronological order.

Figure 4:
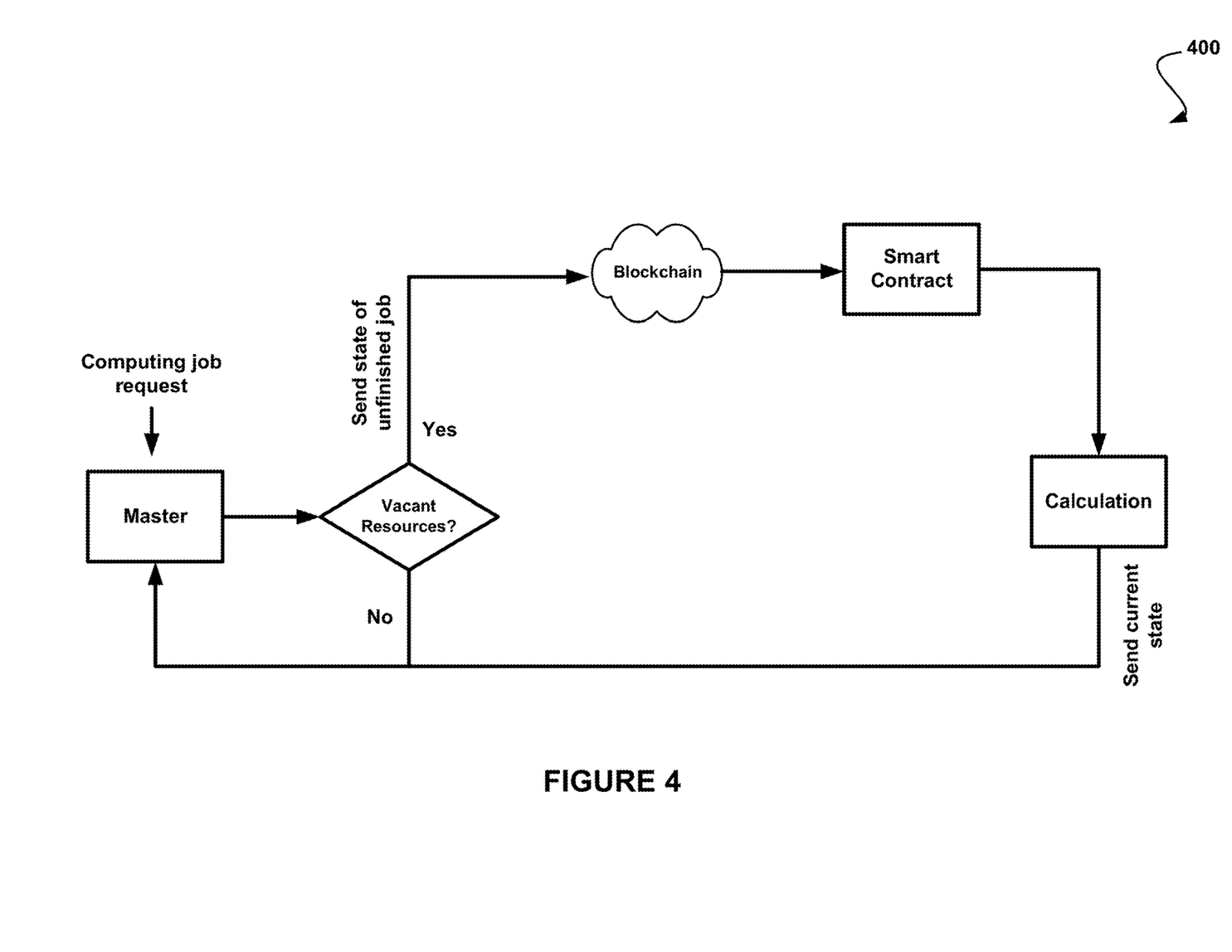
FIG. 4 shows a system flow diagram for performing distributed outsourced computing, in accordance with one embodiment.

FIG. 4 shows a system flow diagram 400 for performing distributed outsourced computing, in accordance with one embodiment. As an option, the diagram 400 may be implemented in the context of the details of the previous figures and/or any subsequent figure(s). Of course, however, the diagram 400 may be implemented in the context of any desired environment. Further, the aforementioned definitions may equally apply to the description below.

As shown, a computing job is sent to a master node. The master node determines whether there are any resources available for aiding in computation of the job. If there are not, the master node performs the job. If there are, the master node publishes the job to the blockchain, including the state of the unfinished job. A smart contract is sent to an available resource including the unfinished job and current job state. The available resource (i.e. node) processes the job and sends a current state either back to the master node or the blockchain (or both).

Figure 5:
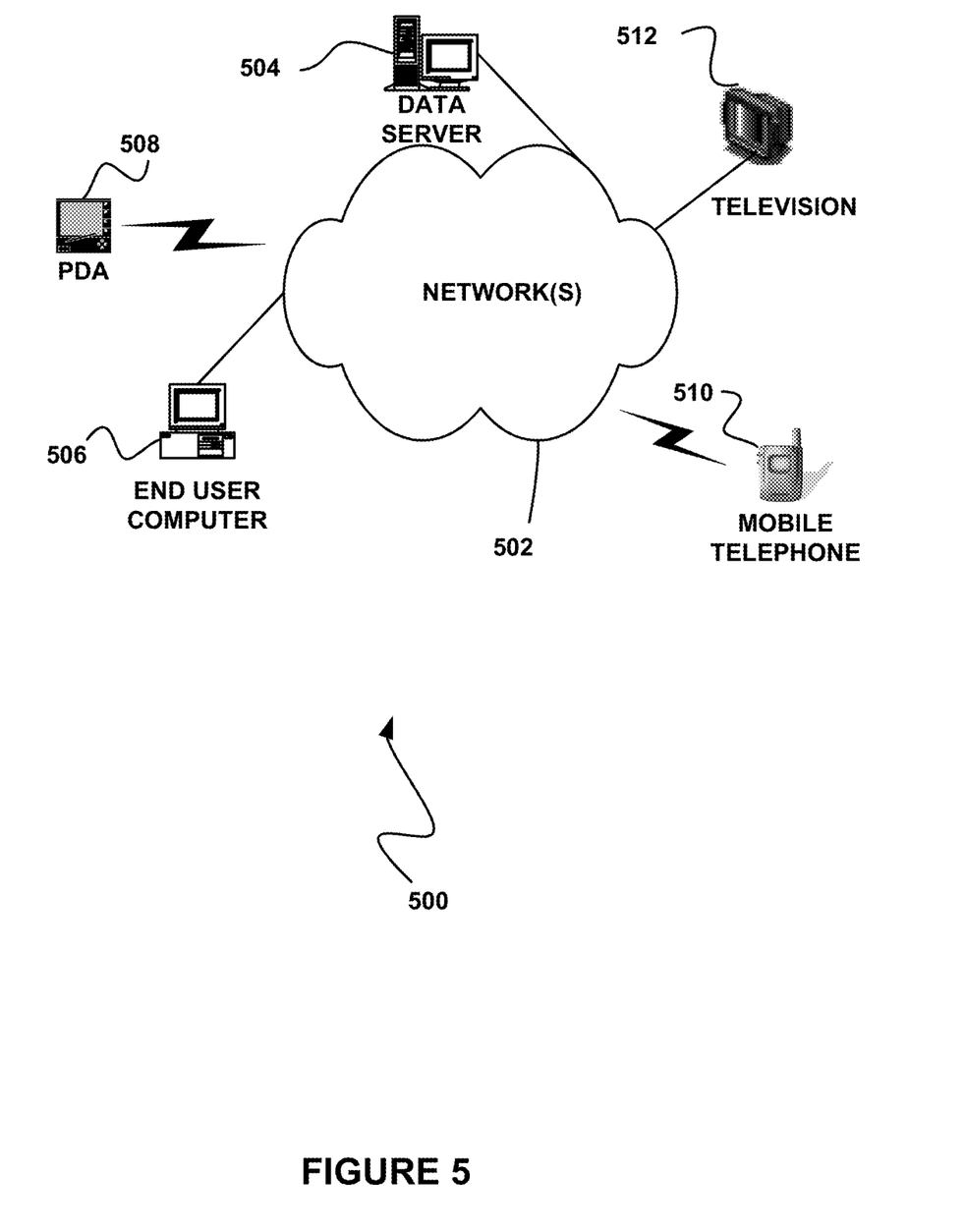
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
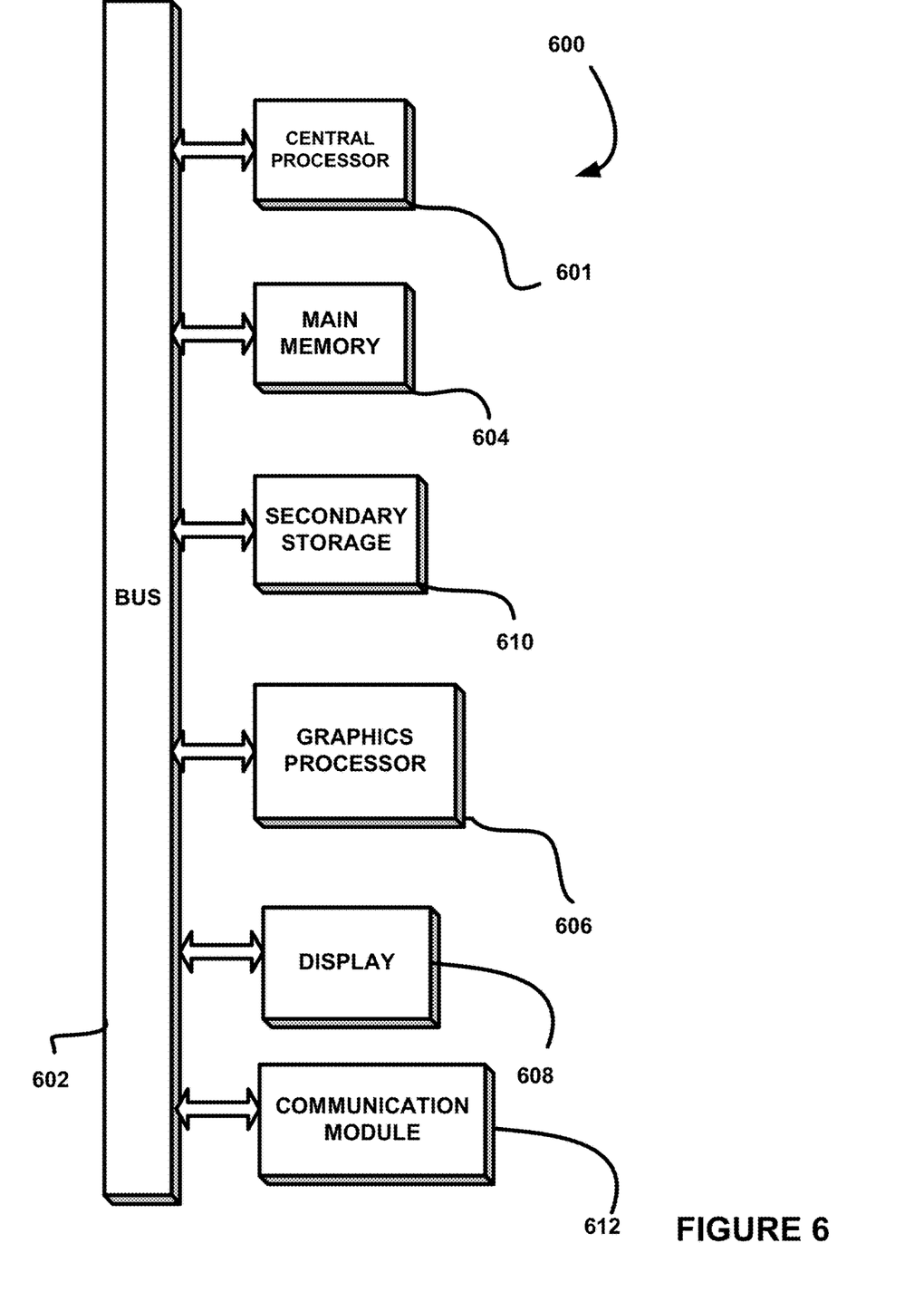
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    monitoring, by a master node in a general distributed computing cluster, a network for available computing resources, the general distributed computing cluster including the master node and a plurality of slave nodes;
    determining, by the master node, that computing resources are available from one or more of the plurality of slave nodes;
    publishing, by the master node, state information associated with one or more unfinished computing tasks dedicated to the master node to a blockchain for access by the one or more of the plurality of slave nodes and for use in completing the one or more unfinished computing tasks;
    wherein the one or more slave nodes update the blockchain with new state information when the one or more computing tasks are completed.

2. The method of claim 1, wherein the master node and the plurality of slave nodes are computing devices.

3. The method of claim 1, wherein the master node and the plurality of slave nodes are in a same geographical location.

4. The method of claim 1, wherein the master node and the plurality of slave nodes are in different geographical locations.

5. The method of claim 1, wherein all nodes in the general distributed computing cluster publish computing task state information to the blockchain.

6. The method of claim 1, wherein the state information for each unfinished computing task of the one or more unfinished computing tasks is a last known state of the unfinished computing task.

7. The method of claim 1, further comprising:
    identifying, by the master node, the one or more of the plurality of slave nodes as an auxiliary master node.

8. The method of claim 1, wherein the one or more of the plurality of slave nodes are identified as an auxiliary master node responsive to determining that the computing resources are available from one or more of the plurality of slave nodes.

9. A non-transitory computer-readable media storing computer instructions which when executed by one or more processors of a device cause the device to:
    monitor, by a master node in a general distributed computing cluster, a network for available computing resources, the general distributed computing cluster including the master node and a plurality of slave nodes;
    determine, by the master node, that computing resources are available from one or more of the plurality of slave nodes;
    publish, by the master node, state information associated with one or more unfinished computing tasks dedicated to the master node to a blockchain for access by the one or more of the plurality of slave nodes and for use in completing the one or more unfinished computing tasks;
    wherein the one or more slave nodes update the blockchain with new state information when the one or more computing tasks are completed.

10. The non-transitory computer readable media of claim 9, wherein the master node and the plurality of slave nodes are computing devices.

11. The non-transitory computer readable media of claim 9, wherein the master node and the plurality of slave nodes are in a same geographical location.

12. The non-transitory computer readable media of claim 9, wherein the master node and the plurality of slave nodes are in different geographical locations.

13. The non-transitory computer readable media of claim 9, wherein all nodes in the general distributed computing cluster publish computing task state information to the blockchain.

14. The non-transitory computer readable media of claim 9, wherein the state information for each unfinished computing task of the one or more unfinished computing tasks is a last known state of the unfinished computing task.

15. The non-transitory computer readable media of claim 9, further comprising:
    identify, by the master node, the one or more of the plurality of slave nodes as an auxiliary master node.

16. The non-transitory computer readable media of claim 9, wherein the one or more of the plurality of slave nodes are identified as an auxiliary master node responsive to determining that the computing resources are available from one or more of the plurality of slave nodes.

17. A system comprising:
    a master node in a general distributed computing cluster, the general distributed computing cluster including the master node and a plurality of slave nodes, wherein the master node includes:
    a non-transitory memory storing instructions; and
    one or more processors in communication with the non-transitory memory that execute the instructions to perform a method comprising:
    monitoring a network for available computing resources;
    determining that computing resources are available from one or more of the plurality of slave nodes;
    publishing, by the master node, state information associated with one or more unfinished computing tasks dedicated to the master node to a blockchain for access by the one or more of the plurality of slave nodes and for use in completing the one or more unfinished computing tasks;

wherein the one or more slave nodes update the blockchain with new state information when the one or more computing tasks are completed.

\* \* \* \* \*